United States Patent
Jefferies et al.

(10) Patent No.: US 10,424,913 B2
(45) Date of Patent: Sep. 24, 2019

(54) DYNAMIC MOTOR CURRENT PHASE UNBALANCE PROTECTION

(71) Applicant: SCHNEIDER ELECTRIC USA, INC.

(72) Inventors: Kevin M. Jefferies, Raleigh, NC (US); Benjamin W. Edwards, Rolesville, NC (US); Matthew L. White, Cary, NC (US); Alan E. Freeman, Raleigh, NC (US); Richard K. Weiler, Wake Forest, NC (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 15/848,552

(22) Filed: Dec. 20, 2017

(65) Prior Publication Data
US 2019/0190253 A1    Jun. 20, 2019

(51) Int. Cl.
H02H 7/08    (2006.01)

(52) U.S. Cl.
CPC .................. H02H 7/08 (2013.01)

(58) Field of Classification Search
CPC ........................................ H02H 7/08
USPC .......................................... 361/31
See application file for complete search history.

(56) References Cited

U.S. PATENT DOCUMENTS

| | | | | |
|---|---|---|---|---|
| 3,895,275 A | * | 7/1975 | Rostad ................. | H02H 7/0833 318/798 |
| 4,065,804 A | * | 12/1977 | Rostad ................. | H02H 7/0833 361/100 |
| 4,967,304 A | * | 10/1990 | Dougherty ........... | H02H 3/0935 361/31 |
| 5,057,962 A | | 10/1991 | Alley et al. | |
| 5,243,489 A | | 9/1993 | Doughtery | |
| 5,448,442 A | | 9/1995 | Farag | |
| 8,222,982 B2 | | 7/2012 | Sullivan et al. | |
| 2003/0052643 A1 | * | 3/2003 | Sweo ...................... | H02P 9/007 318/801 |
| 2010/0231150 A1 | * | 9/2010 | Tan ......................... | H02M 7/49 318/400.3 |
| 2012/0038300 A1 | * | 2/2012 | Kato ....................... | H02P 21/08 318/400.22 |

(Continued)

FOREIGN PATENT DOCUMENTS

EP    2 083 493 A1    7/2009

OTHER PUBLICATIONS

Kenneth W. Swain, Superior Overcurrent Protection with Motor Short-Circuit Protectors, vol. IA-8, No. 6, Nov./Dec. 1972 (Year: 1972).*

(Continued)

*Primary Examiner* — Jorge L Carrasquillo
*Assistant Examiner* — Devon A Joseph
(74) *Attorney, Agent, or Firm* — Locke Lord LLP

(57) ABSTRACT

In accordance with an example embodiment of the invention, in an overload relay for a three-phase motor, an adjusted threshold for detected current phase unbalance is dynamically determined at which the relay will be tripped. The adjusted threshold is a function of a ratio of an average of currents in the three-phases to the rated full load current of the motor, i.e., motor load. As the motor load decreases, the adjusted current phase unbalance threshold is increased, causing the resulting trip time to increase, thereby increasing motor run time and reducing downtime.

7 Claims, 8 Drawing Sheets

(56) References Cited

U.S. PATENT DOCUMENTS

| | | | |
|---|---|---|---|
| 2013/0241463 A1* | 9/2013 | Bando | H02P 9/007 |
| | | | 318/810 |
| 2014/0180611 A1 | 6/2014 | Jefferies et al. | |
| 2014/0321176 A1* | 10/2014 | Seagren | H02M 1/32 |
| | | | 363/53 |
| 2015/0309094 A1 | 10/2015 | Morassutto et al. | |
| 2015/0349387 A1* | 12/2015 | Inaba | H01M 10/44 |
| | | | 700/297 |
| 2017/0047869 A1* | 2/2017 | Edwards | H02P 1/00 |

OTHER PUBLICATIONS

Protecting Motor Circuits, Steven R. Goble, Sep. 1991 (Year: 1991).*
Collins, Chuck, Lawrence B. Farr, and David B. Durocher. "Process modernization upgrade: Selecting and installing a new medium-voltage motor control center." Industry Applications Society Annual Meeting, 2016 IEEE. IEEE, 2016.
TeSys T LTM R Modbus, Motor Management Controller, User Manual, Schneider Electric Industries SAS, Mar. 2013.
Extended European Search Report for Application No. 18209568.7-1202 dated May 27, 2019.
Definitions of Voltage Unbalance; IEEE Power Engineering Review, vol. 21, Issue 5; May 2001.
New Unbalance Factor for Estimating Performance of a Three-Phase Induction Motor With Under- and Overvoltate Unbalance; IEEE Transactions on Energy Conversion, vol. 25, No. 3, pp. 619-625, Sep. 2010.

* cited by examiner

DYNAMIC MOTOR CURRENT PHASE UNBALANCE PROTECTION

BACKGROUND OF THE INVENTION

1. Field of the Invention

In a motor overload relay, a low cost means achieves a variable unbalance trip threshold, resulting in increased motor run time over that available from the known art unbalance trip means that uses a fixed point unbalance threshold.

2. Discussion of the Related Art

Three-phase induction motors have three windings in the stator, which when connected to power lines supplying alternating voltage and current in three-phases, cause magnetic flux to rotate in a positive sequence direction within the stator. The rotor within the stator has an arrangement of closed-loop coils that can rotate and have current induced in them by the rotating magnetic field of the stator windings, forcing the rotor to rotate in the same direction as the positive sequence direction of the magnetic flux within the stator.

As long as the power supply voltages and currents are equal in magnitude in the three-phases, i.e. balanced, the magnetic flux rotates in the positive sequence direction within the stator. However, voltages and currents may occasionally become unbalanced in the three-phases of the power supply lines, for example due to faults in a distribution transformer or unbalanced distribution of single phase loads on the same branch circuit, such as a momentary current draw by starting-up large electrical machinery or by a heavy arc welder.

A three-phase motor may continue to operate with unbalanced voltages and currents, however its efficiency is reduced by both increased current and increased resistance due to heating. The stator winding with the highest current will have the greatest overheating, resulting in deterioration of the insulation of the stator winding. During power supply unbalance, currents flow through the stator windings in a negative sequence direction, resulting in induction of negative sequence voltage in the rotor coils, abnormal current flow, and overheating.

Under conditions of balanced voltages and currents, where the motor operates at a continuous load for a sufficient time, its operating temperature reaches thermal equilibrium. Each motor has a characteristic safe maximum operating temperature permitted by the motor design, above which permanent damage may begin to occur to insulating layers and other components. Under conditions of current phase unbalance, the stator windings generate heat at an increased rate causing a faster rise in the temperature of the surrounding core. The time interval necessary to raise the temperature of the core to the maximum operating temperature is the trip time after the detection of the unbalance condition. To avoid permanent damage to the motor, prior art overload relays set a fixed threshold for detected current phase unbalance at which the relay is prematurely tripped at an interval that is shorter than the trip time.

The state of the art in phase unbalance detection circuits for three-phase motors may be represented by U.S. Pat. No. 5,243,489, which discloses a plurality of operational amplifiers connected to current transformers in the three-phases, to provide a trip signal output when a phase unbalance is detected. The operational amplifiers determine whether there is any difference between pairs of voltage phases that is greater than a threshold value K. The threshold value K is a constant whose value may be manually set over a range of operating conditions.

A problem with the state of the art is that a three-phase motor operating under a light load, may be able to tolerate a greater degree of current phase unbalance without overheating, than it would when operating under a heavier load. However, existing motor overload relays are unable to extend the run time of three-phase motors while operating under a light load, which are otherwise able to tolerate a greater degree of current phase unbalance. Existing motor overload relays are prone to nuisance tripping on unbalance when lightly loaded, causing unnecessary shutdowns when the motor is not actually at risk of overheating.

What is needed is a motor overload relay that provides a low cost means to achieve a variable unbalance trip/time threshold, resulting in increased motor run time over that available from the known art unbalance trip relays that use a fixed point unbalance threshold.

SUMMARY OF THE INVENTION

In accordance with an example embodiment of the invention, an overload relay for a three-phase induction motor provides a low cost means to achieve a variable unbalance trip/time threshold, resulting in increased motor run time over that available from the known art unbalance trip relays that use a fixed point unbalance threshold.

Each type of three-phase motor has a characteristic heating model, which relates the operating temperature of its core due to the ratio of the average current ($I_{avg}$) to rated full load current of the motor (FLC), i.e., the motor load. Heat generated by unbalanced phase currents adds to heat generated by the average current ($I_{avg}$) to raise the operating temperature of the core. The time interval necessary to raise the temperature of the core to the maximum operating temperature is the trip time after the initial detection of the condition of current phase unbalance.

In accordance with an example embodiment of the invention, an adjusted threshold for detecting current phase unbalance is dynamically determined as a function of the ratio of the average of the currents to the rated full load current of the motor. The determination is based on the heating model of the motor. As the motor load decreases, the adjusted current phase unbalance threshold is increased, causing the resulting trip time to increase, thereby increasing motor run time and reducing downtime.

Alternately, as the motor load increases, the adjusted current phase unbalance threshold is decreased, causing the resulting trip time to decrease, thereby preventing the temperature of the core to rise to its maximum operating temperature, to avoid permanent damage to the motor.

In an example embodiment of the invention, a plurality of current transformers associated with the overload relay, connect with corresponding phases of a three-phase power system providing power to a three-phase motor. Each current transformer provides a value representative of current flow it senses through each corresponding phase of the three-phase power system.

A memory in the overload relay, is configured to store a cross-over point of average current (Iavg) to motor full load current (FLC) and a slope of a heating model curve of percent current phase unbalance vs. the ratio of average current (Iavg) to motor full load current (FLC), at the cross-over point of average current (Iavg) to motor full load current (FLC).

A processor in the overload relay, coupled to the memory and the plurality of current transformers, is configured to determine an adjusted threshold for a detected current phase unbalance at which the relay will be tripped, as a function of the ratio of average current (Iavg) to motor full load current (FLC), based on the cross-over point of average current (Iavg) to motor full load current (FLC) and the slope of a heating model curve of percent current phase unbalance vs. the ratio of average current (Iavg) to motor full load current (FLC), wherein as the motor load decreases, the adjusted current phase unbalance threshold is increased, thereby increasing motor run time and reducing downtime.

In an example embodiment of the invention, a method for operating an overload relay for a three-phase induction motor comprises:

receiving, by the relay, values representative of current flow sensed by current transformers corresponding to phases of a three-phase power system providing power to the motor; and determining, by the relay, an adjusted threshold for a detected current phase unbalance at which the relay will be tripped, as a function of a ratio of average current (Iavg) to motor full load current (FLC), based on a cross-over point of average current (Iavg) to motor full load current (FLC) and a slope of a heating model curve of percent current phase unbalance vs. the ratio of average current (Iavg) to motor full load current (FLC), wherein as a motor load decreases, the adjusted current phase unbalance threshold is increased, thereby increasing motor run time and reducing downtime.

DESCRIPTION OF THE FIGURES

Example embodiments of the invention are depicted in the accompanying drawings that are briefly described as follows.

DETAILED DESCRIPTION OF EMBODIMENTS OF THE INVENTION

In accordance with an example embodiment of the invention, in an overload relay for a three-phase motor, an adjusted threshold for detected current phase unbalance is dynamically determined at which the relay is tripped. The adjusted threshold is a function of a ratio of an average of currents in the three-phases to the rated full load current of the motor, i.e., motor load. As the motor load decreases, the adjusted current phase unbalance threshold is increased, causing the resulting trip time to increase, thereby increasing motor run time and reducing downtime.

Figure 1:
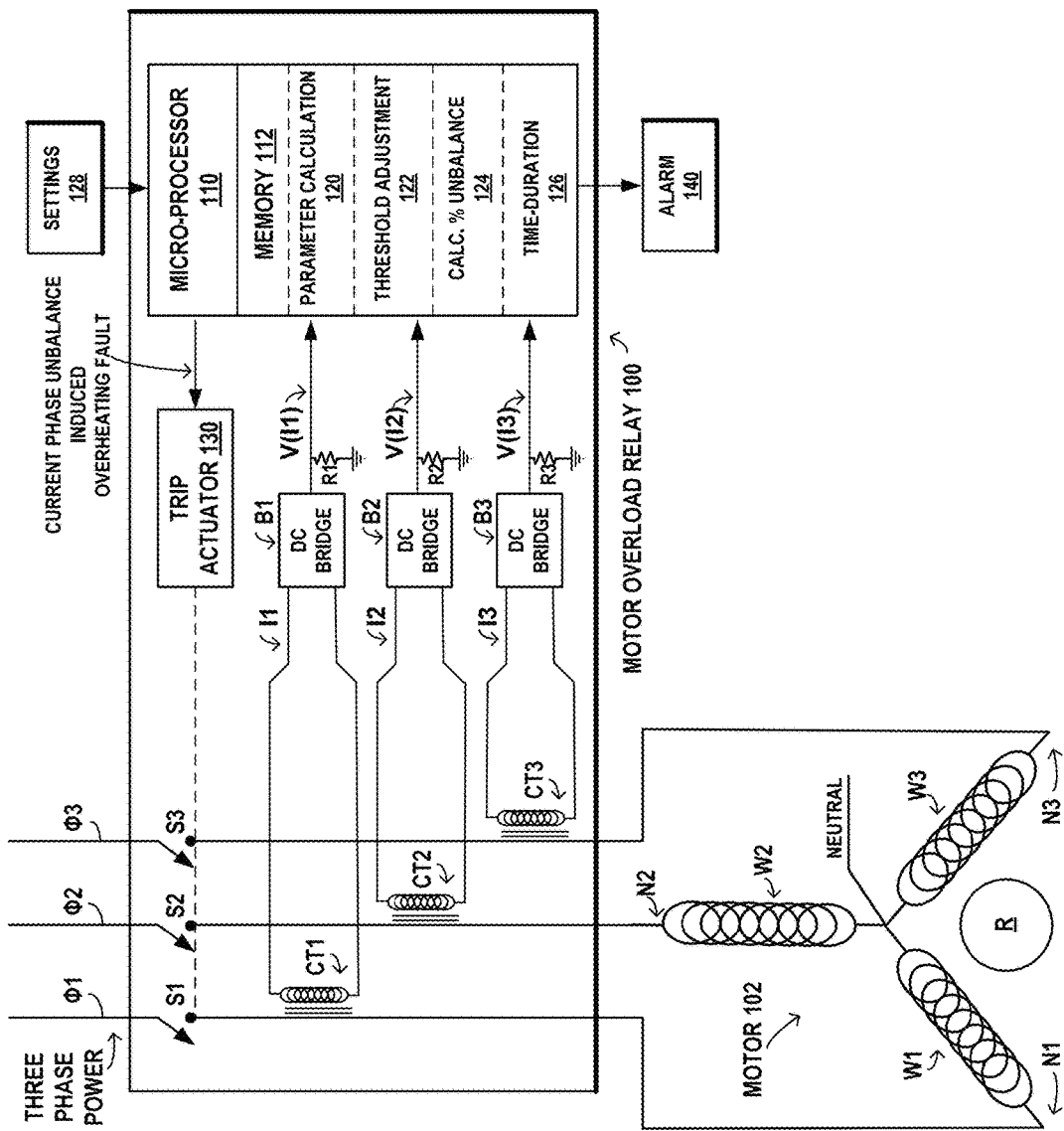
FIG. 1 is an example functional block diagram of the motor overload relay, in accordance with an example embodiment of the invention.

FIG. 1 is an example functional block diagram of the motor overload relay 100, in accordance with an example embodiment of the invention. The relay 100 conducts three-phase currents Φ1, Φ2, and Φ3, through switches S1, S2, and S3 to the power input nodes N1, N2, and N3 of the three-phase motor 102. The stator windings W1, W2, and W3 are respectively connected between the power input nodes N1, N2, and N3 and neutral in the star or wye configuration. The rotor within the stator is driven into rotation when the switches S1, S2, and S3 are closed, delivering three-phase currents Φ1, Φ2, and Φ3, to the stator windings W1, W2, and W3. The trip actuator 130 controls the on/off state of the switches S1, S2, and S3. The current transformers CT1, CT2, and CT3 associated with the overload relay 100, are inductively coupled to the currents Φ1, Φ2, and Φ3, and output a sensing current I1, I2, and I3 to respective DC bridges B1, B2, and B3. The DC bridges B1, B2, and B3 output voltage signals V(I1), V(I2), and V(I3), to a microprocessor 110 and memory 112 in the overload relay. The current transformers CT1, CT2, and CT3 may be located inside the housing of the relay or they may be located outside of it.

The memory 112 stores parameter calculation step 120, threshold adjustment step 122, calculate % unbalance step 124, and time-duration step 126, which are executed by the microprocessor 110. A settings register 128 provides overload protection settings to the microprocessor 110. An alarm unit 140 receives alarm signals from the microprocessor 110. The microprocessor 110 outputs control signals to the trip actuator 130.

The invention operates by taking as input the level of motor load, represented by average current ($I_{avg}$) relative to the motor full load current (FLC) setting. This is used to adjust for the availability of motor capacity due to unbalance based on heating contribution from motor loading.

With the invention, a conventional time-duration step 126 may be used for the current phase unbalance protection, with a dynamic threshold used for evaluation of the presence or absence of a current phase unbalance condition. As motor load increases, the current phase unbalance threshold is decreased and as motor load decreases the current phase unbalance threshold is increased.

Figure 2:
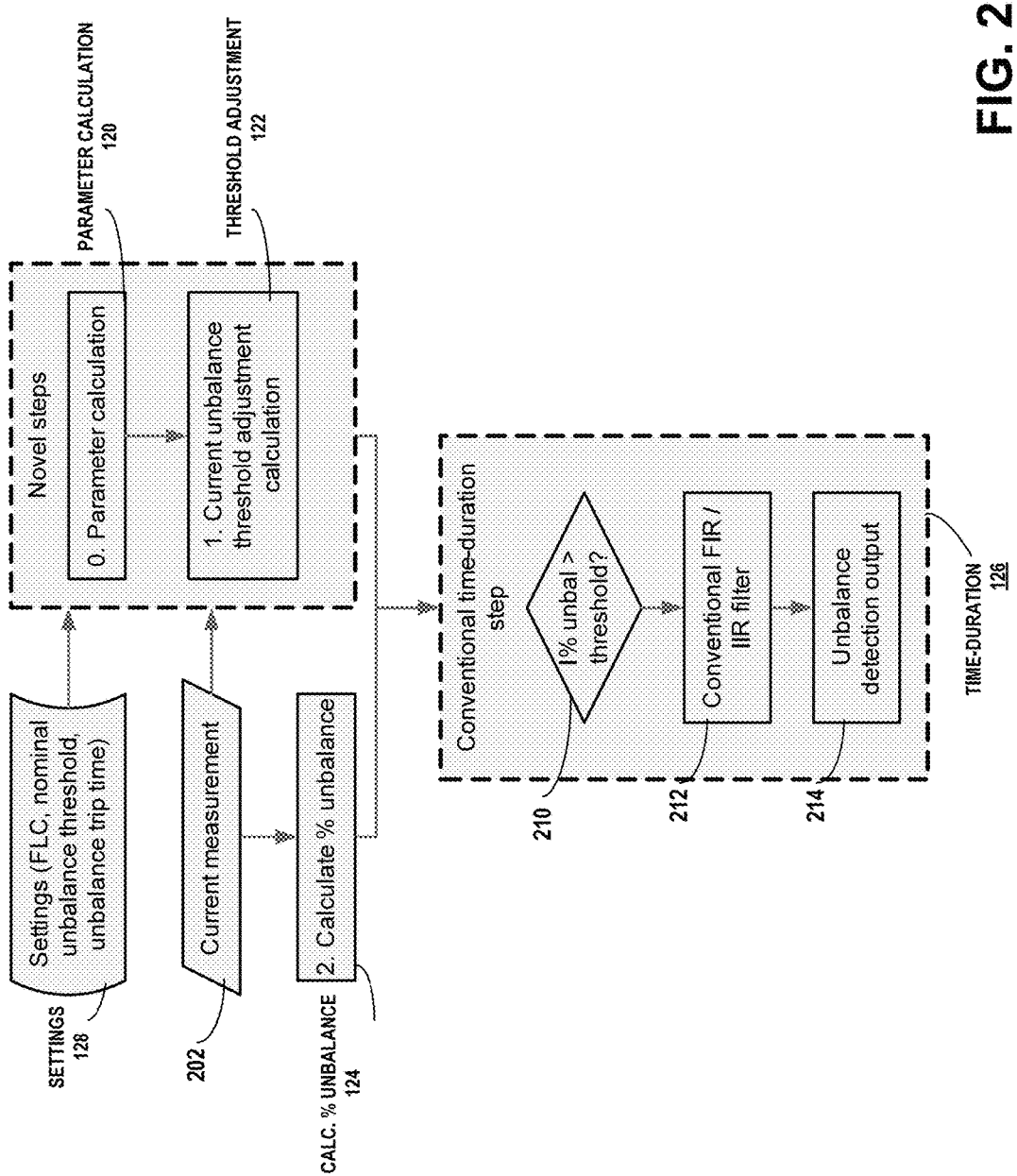
FIG. 2 is an example flow diagram of an example overall process, including a parameter calculation process and a process for determining an adjusted threshold for a detected current phase unbalance at which the motor overload relay will be tripped.

FIG. 2 is an example flow diagram of an example overall process, including a parameter calculation step 120 and an adjusted threshold step 122. The determination of an adjusted threshold 122 varies a threshold value of current phase unbalance at which the motor overload relay 100 will be tripped.

Figure 3:
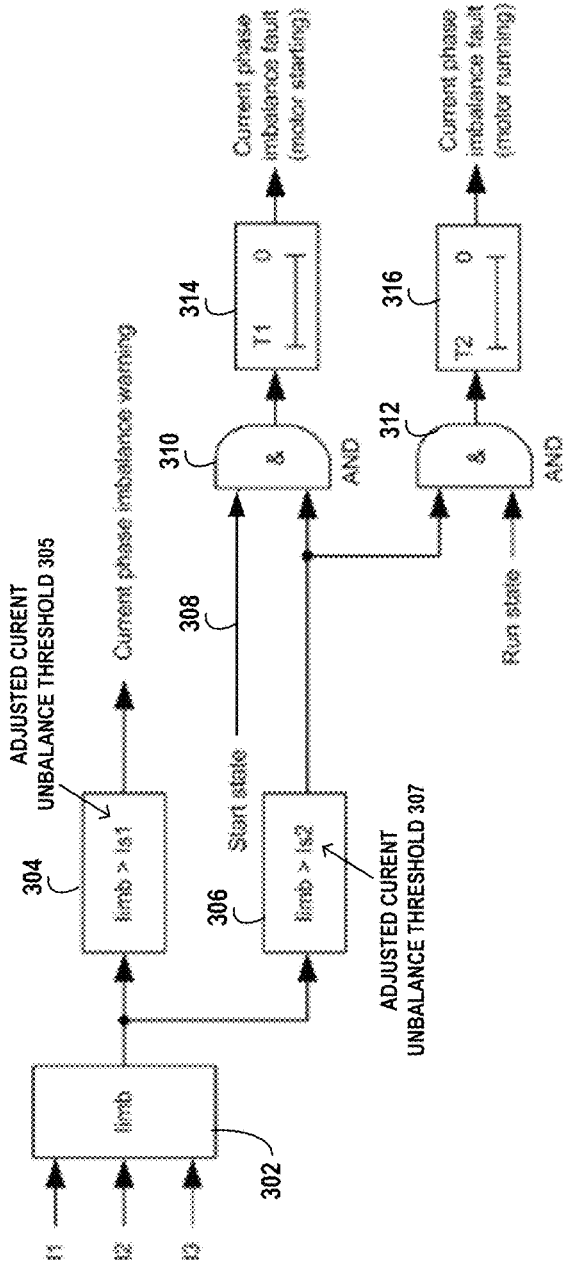
FIG. 3 is an example logic block diagram for generating a warning signal or a fault signal in response to the adjusted threshold for a detected current phase unbalance at which the motor overload relay will be tripped.
Figure 4:
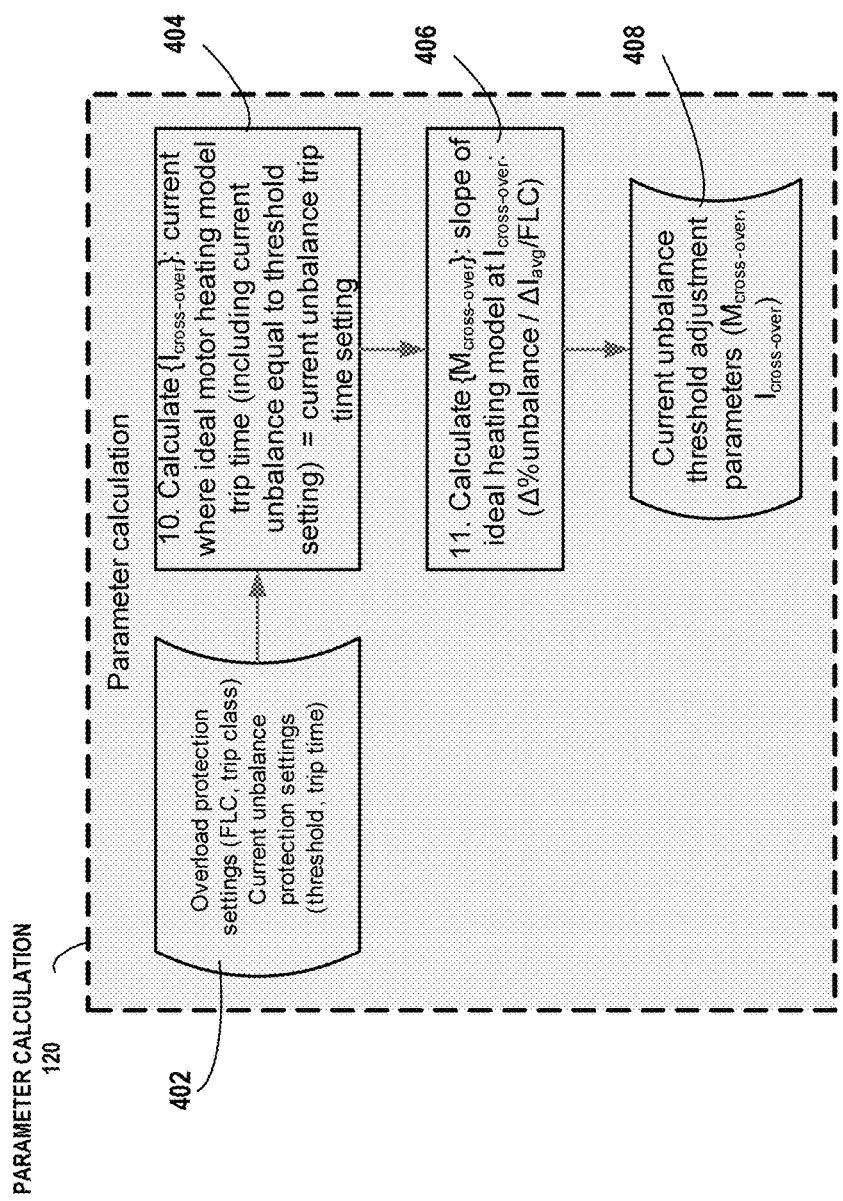
FIG. 4 is an example flow diagram of an example process for the parameter calculation of FIG. 2, which is performed when the input settings are changed.

The settings 128 provides overload protection parameters, such as motor full load current (FLC), nominal current phase unbalance threshold, and unbalance trip time, the settings being provided to the parameter calculation step 120, shown in greater detail in FIG. 4. The current measurement 202 provides input to the threshold adjustment step 122, shown in greater detail in FIG. 5. Conventional time-duration step 126 is shown in greater detail in FIG. 3. It includes a I % unbalanced>threshold decision 210, a conventional Finite Impulse Response (FIR)/Infinite Impulse Response (IIR) filter 212, and an unbalance detection output 214.

As the diagram shows, the invention does not require additional parameters to be entered by the user beyond the overload protection parameters nominally used in the state of the art settings for the motor full load current, the current phase unbalance threshold and current phase unbalance trip time.

The invention uses a novel process with two parts. The first part, parameter calculation of FIG. 4, is necessary to execute only when the input settings are changed. The second part, current phase unbalance threshold adjustment of FIG. 5, calculates an adjusted current phase unbalance threshold during operation based on current measurement input updates. The invention uses conventional current measurement and current phase unbalance calculation, known in the state of the art. The following table shows an example current phase unbalance calculation:

| Calculated Measurement | Formula |
| --- | --- |
| Imbalance ratio of current in phase 1 (in %) | $Ii1 = (\lvert L1 - Iavg \rvert \times 100)/Iavg$ |
| Imbalance ratio of current in phase 2 (in %) | $Ii2 = (\lvert L2 - Iavg \rvert \times 100)/Iavg$ |
| Imbalance ratio of current in phase 3 (in %) | $Ii3 = (\lvert L3 - Iavg \rvert \times 100)/Iavg$ |
| Current imbalance ratio for 3-phase (in %) | $Iimb = Max(Ii1, Ii2, Ii3)$ |

I1 Phase 1 current
I2 Phase 2 current
I3 Phase 3 current
Iimb Current imbalance ratio for 3-phase
Is1 Warning threshold
Is2 Fault threshold
T1 Fault timeout starting
T2 Fault timeout running FIG. 3 is an example logic block diagram for generating a warning signal or a fault signal in response to the adjusted threshold 305 or 307 for a detected current phase unbalance at which the motor overload relay 100 will be tripped. The invention also uses a conventional time-duration step 126 for the current phase unbalance detection, with dynamic input from the step 126 to calculate an adjusted current phase unbalance threshold 305 or 307. Time-duration steps 126 are known in the art. In FIG. 3, phase sensing currents I1, I2, and I3 are input to block 302 to detect a current unbalance ratio Iimb for three-phase. In block 304, the current phase unbalance ratio Iimb is compared with adjusted current phase balance threshold 305, which is a warning threshold Is1. If the current phase unbalance ratio Iimb is greater than the adjusted current phase balance threshold 305 Is1, then a current phase unbalance warning is output to the alarm 140 of FIG. 1.

In block 306, the current phase unbalance ratio Iimb is compared with adjusted current phase balance threshold 307, which is a fault threshold Is2. If the current phase unbalance ratio Iimb is greater than the adjusted current phase balance threshold 307 Is2, then outputs are sent to the AND gates 310 and 312. The start state 308 input to the AND gate 310 and the run state input to the AND gate 312 are signals generated by the current measurement block 202 of FIG. 2. The output of the AND gate 310 goes to the fault time out starting 314, which after the timeout T1, signals a current phase unbalance fault for motor starting. The output of the AND gate 312 goes to the fault time out starting 316, which after the timeout T2, signals a current phase unbalance fault for motor running. The fault timeouts T1 and T2 delay the trip action to minimize nuisance trips.

FIG. 4 is an example flow diagram of an example of the parameter calculation process 120 of FIG. 2, which is performed when the input settings are changed.

Step 402 provides overload protection settings (FLC, trip class), and current phase unbalance protection settings (threshold, trip time).

Figure 6:
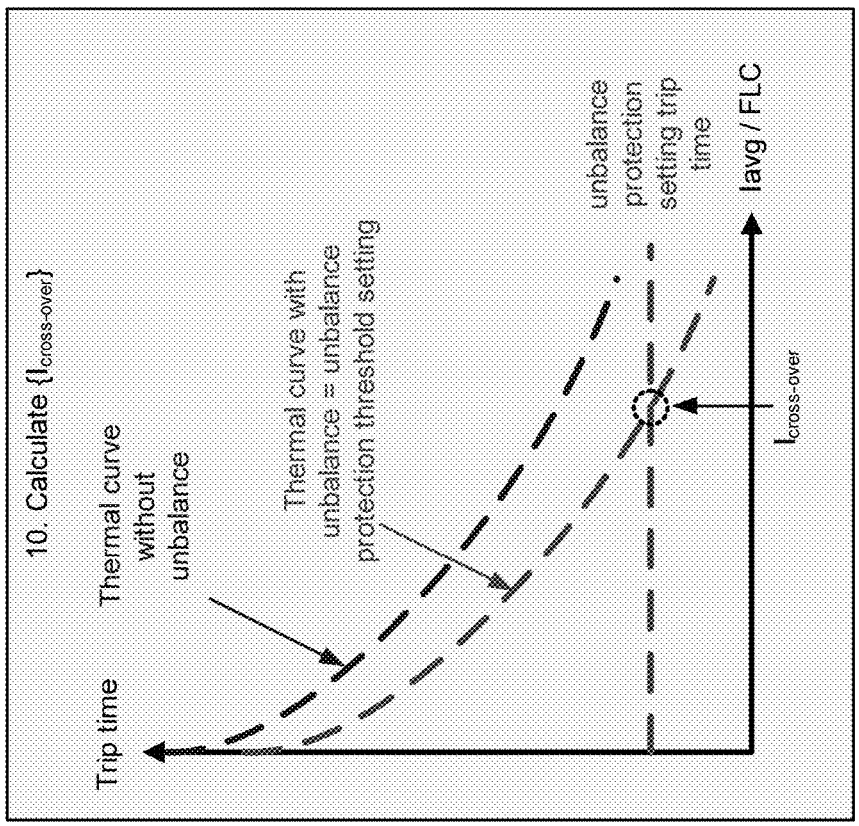
FIG. 6 is an example graph illustrating part of the parameter calculation process of FIG. 4. The graph has as the abscissa the ratio of the average of the currents in the three-phases ($I_{avg}$) to the rated full load current of the motor (FLC), i.e., the motor load. The graph has as the ordinate the trip time. The parameter $I_{cross-over}$ is calculated as the current where the trip time equals the fixed value unbalance protection trip time setting.

Step 404 performs the calculation {Icross-over}: current where ideal motor heating model trip time (including current phase unbalance equal to threshold setting)=current phase unbalance trip time setting, as shown in FIG. 6. The thermal curve (trip time), which includes compensation for current unbalance, is calculated as a function of Iavg/FLC. The parameter Icross-over is calculated as the current where the trip time equals the unbalance protection trip time setting value.

Figure 7:
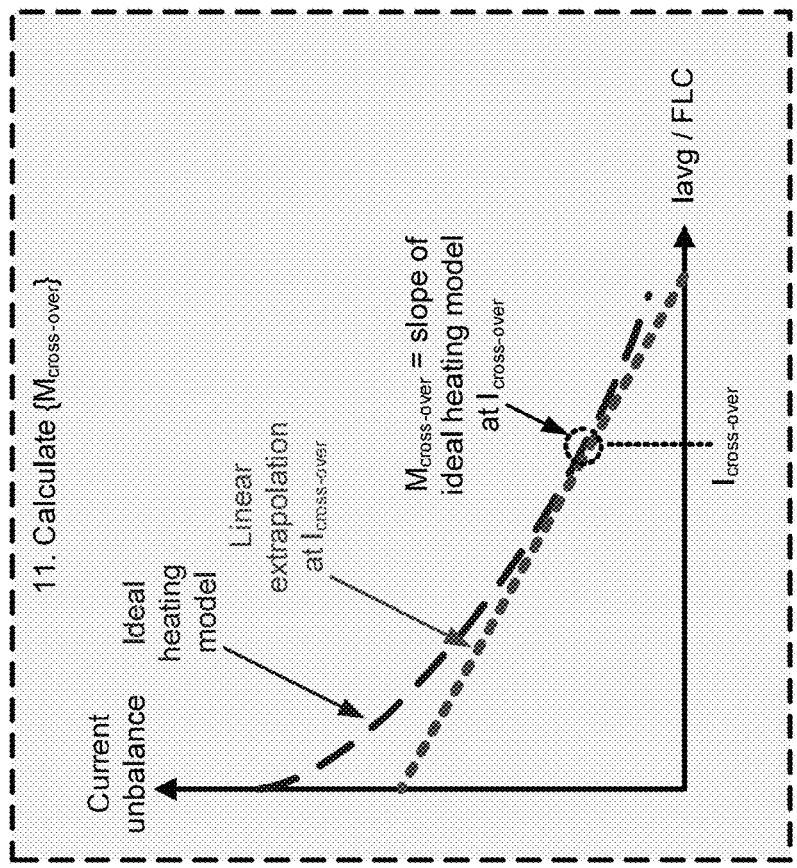
FIG. 7 is an example graph illustrating another part of the parameter calculation process of FIG. 4. The graph has as the abscissa the ratio of the average of the currents in the three-phases (Iavg) to the rated full load current of the motor (FLC). The graph has as the ordinate the current phase unbalance. The heating model line is calculated as a function of the ratio $I_{avg}$/FLC and a fixed trip time (corresponding to the fixed value unbalance protection threshold setting) and expressed as current phase unbalance. This calculation of the heating model line is used to determine the slope M of the heating model line Δ{current phase unbalance}/Δ{$I_{avg}$/FLC}.

Step 406 performs the calculation {$M_{cross-over}$}: slope of ideal heating model at Icross-over: (Δ % unbalance/ΔIavg/FLC), as shown in FIG. 7. The heating model is calculated as a function of Iavg/FLC and a fixed trip time (equal to the unbalance protection threshold setting) and expressed as current unbalance. In other words, the amount of unbalance to achieve the fixed trip time is calculated as a function of the motor load current. This calculation of the heating model is used to determine the slope of the model Δ{current unbalance}/Δ{Iavg/FLC}.

Figure 8:
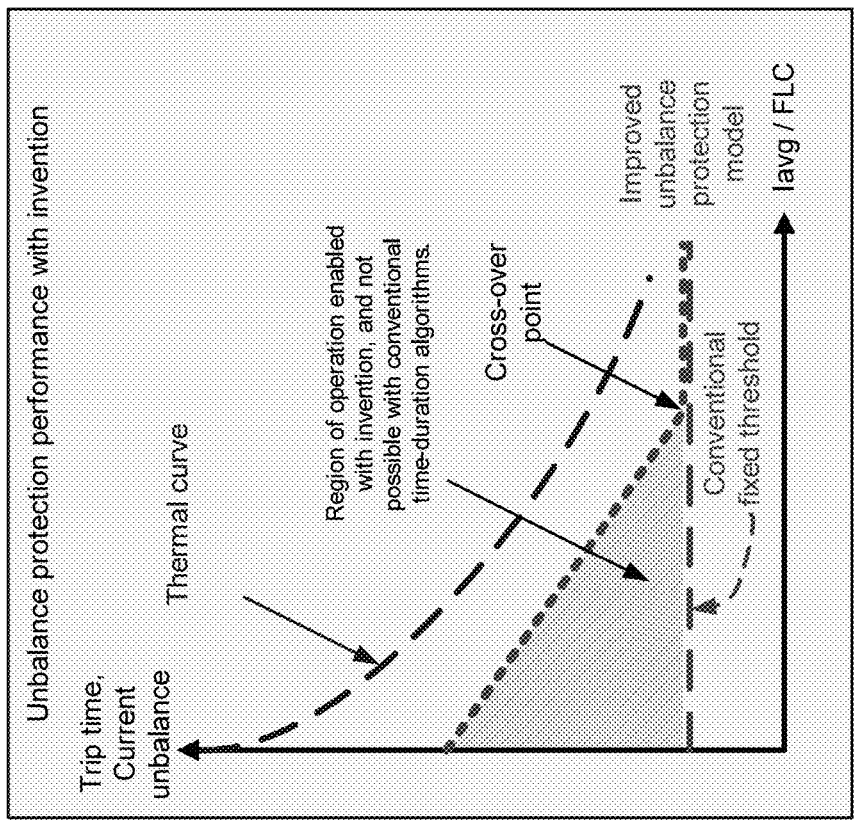
FIG. 8 is an example graph illustrating the current phase unbalance threshold adjustment calculation process of FIG. 5. The graph has as the abscissa the ratio of the average of the currents in the three-phases (Iavg) to the rated full load current of the motor (FLC). The graph has two variables as the ordinate. The first ordinate variable is trip time for the thermal curve line shown in the graph. The second ordinate variable is current phase balance for the region of operation enabled by the invention, as shown in the graph.

Step 408 performs current phase unbalance threshold adjustment parameters ($M_{cross-over}$, $I_{cross-over}$), as shown in FIG. 8. Note the y-axis of trip time applies to the thermal curve plot; the y-axis of current unbalance applies to the threshold plots. The invention enables better utilization of the available capacity of the motor by reducing operation of the protection function in an undesired region of operation. The invention reduces the area of over-protection between the capacity of the motor (represented by the curve for an ideal heating model) by accounting for the increased tolerance of unbalance with relatively lower motor load.

The invention makes a simplifying assumption, for example in step 406, calculate {Mcross-over}, by using a linear model of the relationship between current unbalance and Iavg/FLC. Because the curve of unbalance to reach a given fixed trip time is monotonic, the assumption reasonably ensures that the adjusted current unbalance threshold calculation will not yield an under-protection of the motor.

Figure 5:
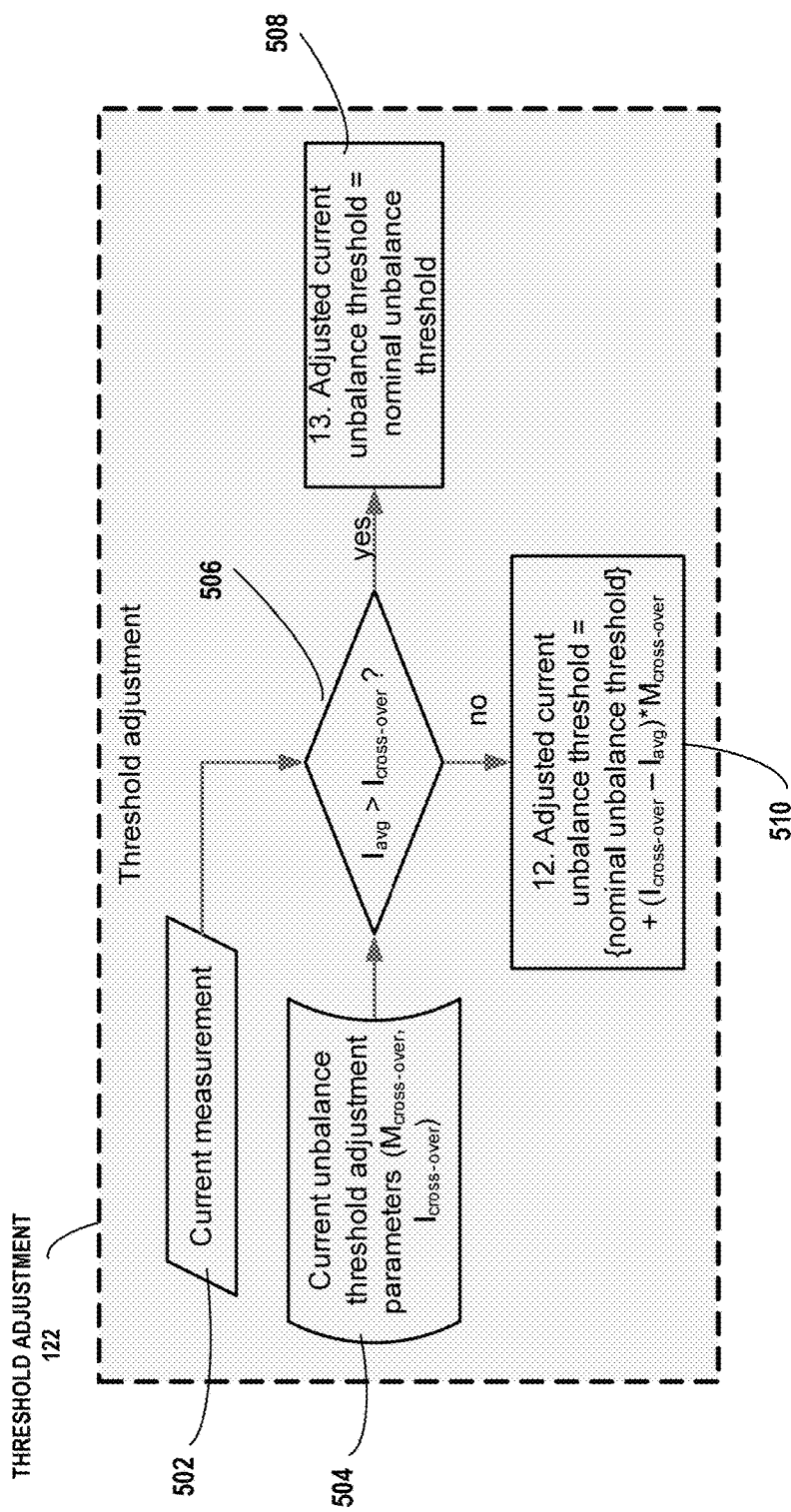
FIG. 5 is an example flow diagram of an example process for the current phase unbalance threshold adjustment of FIG. 2, which calculates the adjusted current phase unbalance threshold while the motor is running, based on current measurement input updates.

FIG. 5 is an example flow diagram of an example process for the current phase unbalance threshold adjustment 122 of FIG. 2, which calculates the adjusted current phase unbalance threshold while the motor is running, based on current measurement input updates. Step 502 provides the current measurement to decision Step 506. Step 504 provides current phase unbalance threshold adjustment parameters ($M_{cross-over}$, $I_{cross-over}$) to decision Step 506. Decision Step 506 makes the comparison $I_{avg} > I_{cross-over}$. If the decision is "no", then Step 510 calculates: Adjusted current phase unbalance threshold={nominal unbalance threshold}+ ($I_{cross-over} - I_{avg}$)*$M_{cross-over}$. If the decision is "yes", Step 508 calculates: Adjusted current phase unbalance threshold=nominal unbalance threshold. The adjusted current phase unbalance threshold is then applied to logic blocks 304 and 306 of FIG. 2.

FIG. 6 is an example graph illustrating part of the parameter calculation process of FIG. 4. The graph has as the abscissa the ratio of the average of the currents in the three-phases ($I_{avg}$) to the rated full load current of the motor (FLC), i.e., the motor load. The graph has as the ordinate the trip time. The parameter $I_{cross-over}$ is calculated as the current where the trip time equals the fixed value unbalance protection trip time setting. The thermal curve (trip time), including compensation for current phase unbalance, is calculated as a function of $I_{avg}$/FLC. The parameter $I_{cross-over}$ is calculated as the current where the trip time equals the unbalance protection trip time setting value.

FIG. 7 is an example graph illustrating another part of the parameter calculation process of FIG. 4. The graph has as the abscissa the ratio of the average of the currents in the three-phases ($I_{avg}$) to the rated full load current of the motor (FLC). The graph has as the ordinate the current phase unbalance. The heating model line is calculated as a function of the ratio $I_{avg}$/FLC and a fixed trip time (corresponding to the fixed value unbalance protection threshold setting) and expressed as current phase unbalance. This calculation of the heating model line is used to determine the slope M of the heating model line $\Delta${current phase unbalance}/$\Delta${$I_{avg}$/FLC}. In other words, the amount of unbalance to achieve the fixed trip time is calculated as a function of the motor load current.

FIG. 8 is an example graph illustrating the current phase unbalance threshold adjustment calculation process of FIG. 5. The graph has as the abscissa the ratio of the average of the currents in the three-phases ($I_{avg}$) to the rated full load current of the motor (FLC). The graph has two variables as the ordinate. The first ordinate variable is trip time for the thermal curve line shown in the graph. The second ordinate variable is current phase balance for the region of operation enabled by the invention, as shown in the graph. The diagram shows the current phase unbalance trip characteristic achieved by executing the steps described above.

In an alternate embodiment, an additional output may be provided by the function. The output may be a warning or information provided to the user by alarm 140 of FIG. 1, or it could be an additional protection function providing a trip to stop the motor operation. The output is provided when the result of the comparison, $I_{avg} > I_{cross-over}$, is "yes". The output would indicate that the motor is operating in an area of relatively high load concurrent with relatively high unbalance.

In an alternate embodiment, the invention uses a novel process with two parts, but rather than adjusting the current phase unbalance threshold, the current phase unbalance trip time is adjusted. Overall similar algorithm steps are used (parameter calculation, protection adjustment based on measurement), however the adjustment is performed on a different characteristic of the protection function, i.e., the trip time. This is accomplished by repeating the steps of FIG. 4, while replacing the ordinate of current phase unbalance with an ordinate of trip time, particularly in steps 406 and 408.

The resulting invention provides an overload relay for a three-phase induction motor featuring a low cost means to achieve a variable unbalance trip threshold, resulting in increased motor run time over that available from the known art unbalance trip relays that use a fixed point unbalance threshold.

Although specific example embodiments of the invention have been disclosed, persons of skill in the art will appreciate that changes may be made to the details described for the specific example embodiments, without departing from the spirit and the scope of the invention.

The invention claimed is:

1. An apparatus, comprising:
   a plurality of current transformers associated with an overload relay, connecting with corresponding phases of a three-phase power system providing power to a three-phase motor, each current transformer providing a value representative of current measurement input updates of current flow it senses through each corresponding phase of the three-phase power system;
   at least one processor associated with the overload relay, coupled to the plurality of current transformers;
   at least one memory associated with the overload relay, including computer program code, wherein the computer program code, when executed by operation of the at least one processor, performs an operation comprising:
      receiving values representative of current measurement input updates of current flow sensed by the current transformers corresponding to phases of the three-phase power system providing power to the three phase induction motor;
      computing an updated average current of the received current measurement input updates;
      adjusting a threshold for a detected current phase unbalance at which the overload relay will be tripped, as a function of a ratio of the updated average current to motor full load current, based on a cross-over point of average current to motor full load current and a slope of a heating model curve of percent current phase unbalance vs. a ratio of average current to motor full load current;
      increasing the adjusted threshold for a detected current phase unbalance at which the relay will be tripped, when the ratio of the updated average current to motor full load current decreases; and
      decreasing the adjusted threshold for a detected current phase unbalance at which the relay will be tripped, when the ratio of the updated average current to motor full load current increases.

2. The apparatus of claim 1, wherein the computer program code, when executed by operation of the at least one processor, performs an operation further comprising:
   comparing the current phase unbalance threshold adjustment with current phase unbalance for the three-phase induction motor to determine a current phase unbalance fault.

3. A method, comprising:
   receiving, by an overload relay, values representative of current measurement input updates of current flow corresponding to phases of a three-phase power system providing power to a three phase induction motor;

computing, by the overload relay, an updated average current of the current measurement input updates;

adjusting, by the overload relay, a threshold for a detected current phase unbalance at which the overload relay will be tripped, as a function of a ratio of the updated average current to motor full load current, based on a cross-over point of average current to motor full load current and a slope of a heating model curve of percent current phase unbalance vs. a ratio of average current to motor full load current;

increasing, by the overload relay, the adjusted threshold for a detected current phase unbalance at which the relay will be tripped, when the ratio of the updated average current to motor full load current decreases; and decreasing, by the overload relay, the adjusted threshold for a detected current phase unbalance at which the relay will be tripped, when the ratio of the updated average current to motor full load current increases.

4. The method of claim 3, further comprising:
comparing, by the overload relay, the current phase unbalance threshold adjustment with current phase unbalance for the three-phase induction motor to determine a current phase unbalance fault.

5. A method, comprising:
modeling, by an overload relay, an effect of percent current phase unbalance on a thermal overload trip curve of trip time vs. a ratio of average current to motor full load current, using a conventional fixed threshold setting for a three-phase induction motor of a fixed percent current phase unbalance;

determining, by the overload relay, a cross-over point of a ratio of average current to motor full load current, of the modeled thermal overload trip curve of the motor with trip time at the fixed percent current phase unbalance;

calculating, by the overload relay, a slope of a heating model curve of percent current phase unbalance vs. the ratio of average current to motor full load current of the motor, at the cross-over point of average current to motor full load current;

storing, by the overload relay, the cross-over point of average current to motor full load current and the slope of the heating model curve of percent current phase unbalance vs. the ratio of average current to motor full load current, at the cross-over point of average current to motor full load current;

receiving, by the overload relay, values representative of current measurement input updates of current flow corresponding to phases of a three-phase power system providing power to the motor;

computing, by the overload relay, an updated average current of the current measurement input updates;

adjusting, by the overload relay, a threshold for a detected current phase unbalance at which the overload relay will be tripped, as a function of a ratio of the updated average current to motor full load current, based on the cross-over point of average current to motor full load current and the slope of the heating model curve of percent current phase unbalance vs. the ratio of average current to motor full load current;

increasing, by the overload relay, the adjusted threshold for a detected current phase unbalance at which the relay will be tripped, when the ratio of the updated average current to motor full load current decreases; and decreasing, by the overload relay, the adjusted threshold for a detected current phase unbalance at which the relay will be tripped, when the ratio of the updated average current to motor full load current increases.

6. The method of claim 5, comprising:
calculating, by the overload relay, a slope of a heating model curve of change in trip time vs. the ratio of average current to motor full load current, at the cross-over point of average current to motor full load current;

storing, by the overload relay, the cross-over point of average current to motor full load current and the slope of the heating model curve of change in trip time vs. the ratio of average current to motor full load current, at the cross-over point of average current to motor full load current;

receiving, by the overload relay, values representative of current measurement input updates of current flow corresponding to phases of the three-phase power system providing power to the motor;

computing, by the overload relay, an updated average current of the current measurement input updates;

adjusting, by the overload relay, a current unbalance trip time threshold for a detected current phase unbalance at which the relay will be tripped, as a function of a ratio of the updated average current to motor full load current, based on the cross-over point of average current to motor full load current and the slope of the heating model curve of change in trip time vs. the ratio of average current to motor full load current;

increasing, by the overload relay, the adjusted current unbalance trip time threshold for a detected current phase unbalance at which the relay will be tripped, when the ratio of the updated average current to motor full load current decreases; and decreasing, by the overload relay, the adjusted current unbalance trip time threshold for a detected current phase unbalance at which the relay will be tripped, when the ratio of the updated average current to motor full load current increases.

7. A method, comprising:
modeling, by an overload relay, an effect of percent current phase unbalance on a thermal overload trip curve of trip time vs. a ratio of average current to motor full load current, using a conventional fixed threshold setting for a three-phase induction motor of a fixed percent current phase unbalance;

determining, by the overload relay, a cross-over point ratio of average current to motor full load current, of the modeled thermal overload trip curve of the motor with trip time at the fixed percent current phase unbalance;

calculating, by the overload relay, a slope of a heating model curve of change in trip time vs. the ratio of average current to motor full load current of the motor, at the cross-over point of average current to motor full load current;

storing, by the overload relay, the cross-over point of average current to motor full load current and the slope of the heating model curve of change in trip time vs. the ratio of average current to motor full load current, at the cross-over point of average current to motor full load current;

receiving, by the overload relay, values representative of current measurement input updates of current flow corresponding to phases of a three-phase power system providing power to the motor;

computing, by the overload relay, an updated average current of the current measurement input updates;

adjusting, by the overload relay, a current unbalance trip time threshold for a detected current phase unbalance at which the relay will be tripped, as a function of a ratio of the updated average current to motor full load current, based on the cross-over point of average current to motor full load current and the slope of the heating model curve of change in trip time vs. the ratio of average current to motor full load current;

increasing, by the overload relay, the adjusted current unbalance trip time threshold for a detected current phase unbalance at which the relay will be tripped, when the ratio of the updated average current to motor full load current decreases; and decreasing, by the overload relay, the adjusted current unbalance trip time threshold for a detected current phase unbalance at which the relay will be tripped, when the ratio of the updated average current to motor full load current increases.

\* \* \* \* \*